(12) United States Patent
Inoue et al.

(10) Patent No.: US 8,051,741 B2
(45) Date of Patent: Nov. 8, 2011

(54) MANAGING STRUCTURE FOR UMBILICAL MEMBER OF INDUSTRIAL ROBOT

(75) Inventors: Toshihiko Inoue, Fujiyoshida (JP); Kazutaka Nakayama, Minamitsuru-gun (JP); Takatoshi Iwayama, Minamitsuru-gun (JP)

(73) Assignee: FANUC Ltd, Minamitsuru-Gun, Yamanashi (JP)

( * ) Notice: Subject to any disclaimer, the term of this patent is extended or adjusted under 35 U.S.C. 154(b) by 289 days.

(21) Appl. No.: 12/385,656

(22) Filed: Apr. 15, 2009

(65) Prior Publication Data

US 2009/0200432 A1      Aug. 13, 2009

Related U.S. Application Data

(62) Division of application No. 11/142,497, filed on Jun. 2, 2005, now abandoned.

(30) Foreign Application Priority Data

Jun. 4, 2004   (JP) .................................. 2004-167411

(51) Int. Cl.
*B25J 18/04* (2006.01)
(52) U.S. Cl. ............ 74/490.01; 901/40; 901/29; 901/15
(58) Field of Classification Search ............... 74/490.02, 74/490.03; 414/918, 735; 901/28, 29, 15, 901/40; 219/137.9
See application file for complete search history.

(56) References Cited

U.S. PATENT DOCUMENTS

| | | | | |
|---|---|---|---|---|
| 4,687,899 A * | 8/1987 | Acheson | .................... | 219/76.14 |
| 6,230,859 B1 | 5/2001 | Springmann | | |
| 6,431,018 B1 | 8/2002 | Okada et al. | | |
| 7,105,771 B2 * | 9/2006 | Inoue et al. | ................. | 219/125.1 |
| 7,196,285 B2 * | 3/2007 | Inoue et al. | ................. | 219/137.9 |
| 2003/0226940 A1 | 12/2003 | Karlinger | | |
| 2004/0261562 A1 * | 12/2004 | Haniya et al. | ............... | 74/490.02 |
| 2005/0199601 A1 * | 9/2005 | Inoue et al. | ................. | 219/125.1 |

FOREIGN PATENT DOCUMENTS

DE   101 41 407 A1   10/2002

(Continued)

OTHER PUBLICATIONS

Japanese Notice of Reasons for Rejection mailed Jan. 23, 2007 issued in Japanese Application No. 2004-167411 (including a partial translation thereof).

(Continued)

*Primary Examiner* — Richard W Ridley
*Assistant Examiner* — Terence Boes
(74) *Attorney, Agent, or Firm* — Drinker Biddle & Reath LLP

(57) ABSTRACT

A managing structure for an umbilical member includes a flexible conduit for leading an umbilical member inserted therein from a front arm of a robot to a working tool mounted on a wrist of the robot, a first conduit mounting portion provided adjacent to the front arm, and a second conduit mounting portion provided adjacent to a point where the umbilical member is connected to the working tool. One end of the conduit is attached to the first conduit mounting portion, while the other end of the conduit is attached to the second conduit mounting portion. The conduit is laid so that a section thereof between the first conduit mounting portion and the second conduit mounting portion does not contact the body of the robot.

5 Claims, 8 Drawing Sheets

FOREIGN PATENT DOCUMENTS

| | | |
|---|---|---|
| DE | 101 46 366 A1 | 10/2002 |
| JP | 63-317263 A | 12/1988 |
| JP | 05-084689 | 4/1993 |
| JP | 05-060669 U | 8/1993 |
| JP | 9-216189 | 8/1997 |
| JP | 09-239687 | 9/1997 |
| JP | 2001-150382 | 6/2001 |
| JP | 2003-200376 | 7/2003 |
| JP | 2003-275987 | 9/2003 |
| WO | 97/39505 A | 10/1997 |
| WO | 03/035337 A1 | 5/2003 |

OTHER PUBLICATIONS

European Search Report mailed Sep. 1, 2005 issued in European Application No. 05011692.0.

* cited by examiner

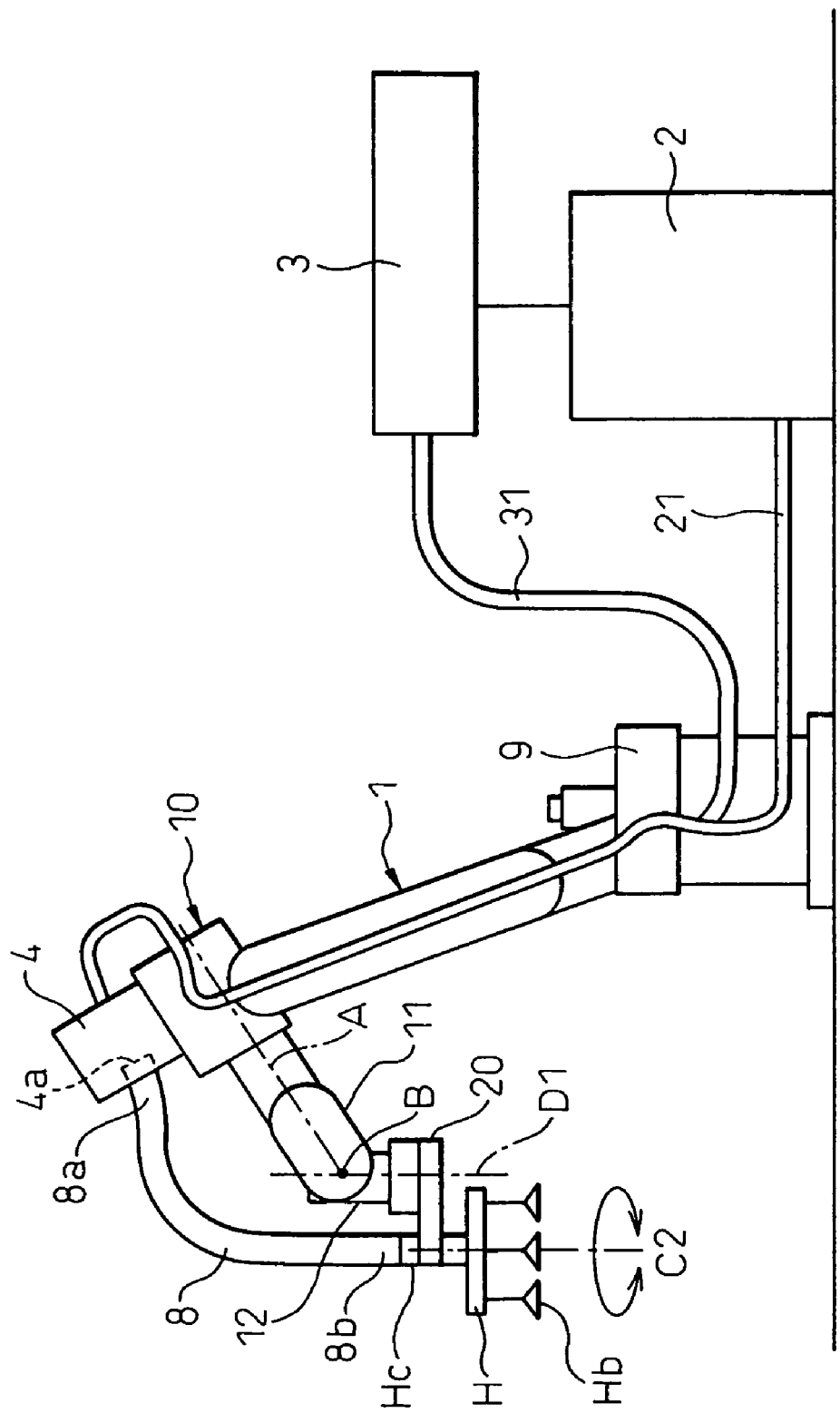

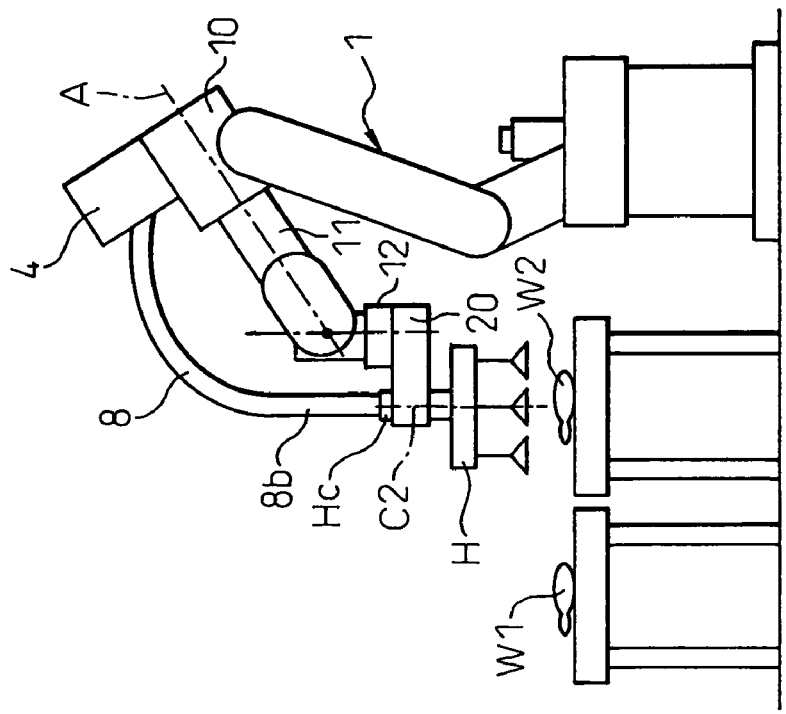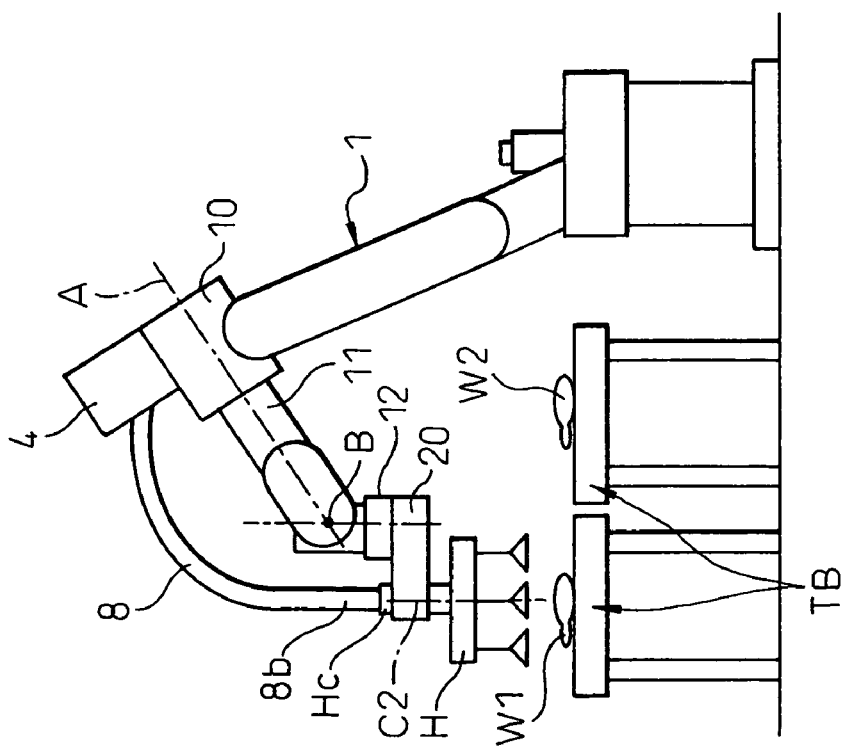

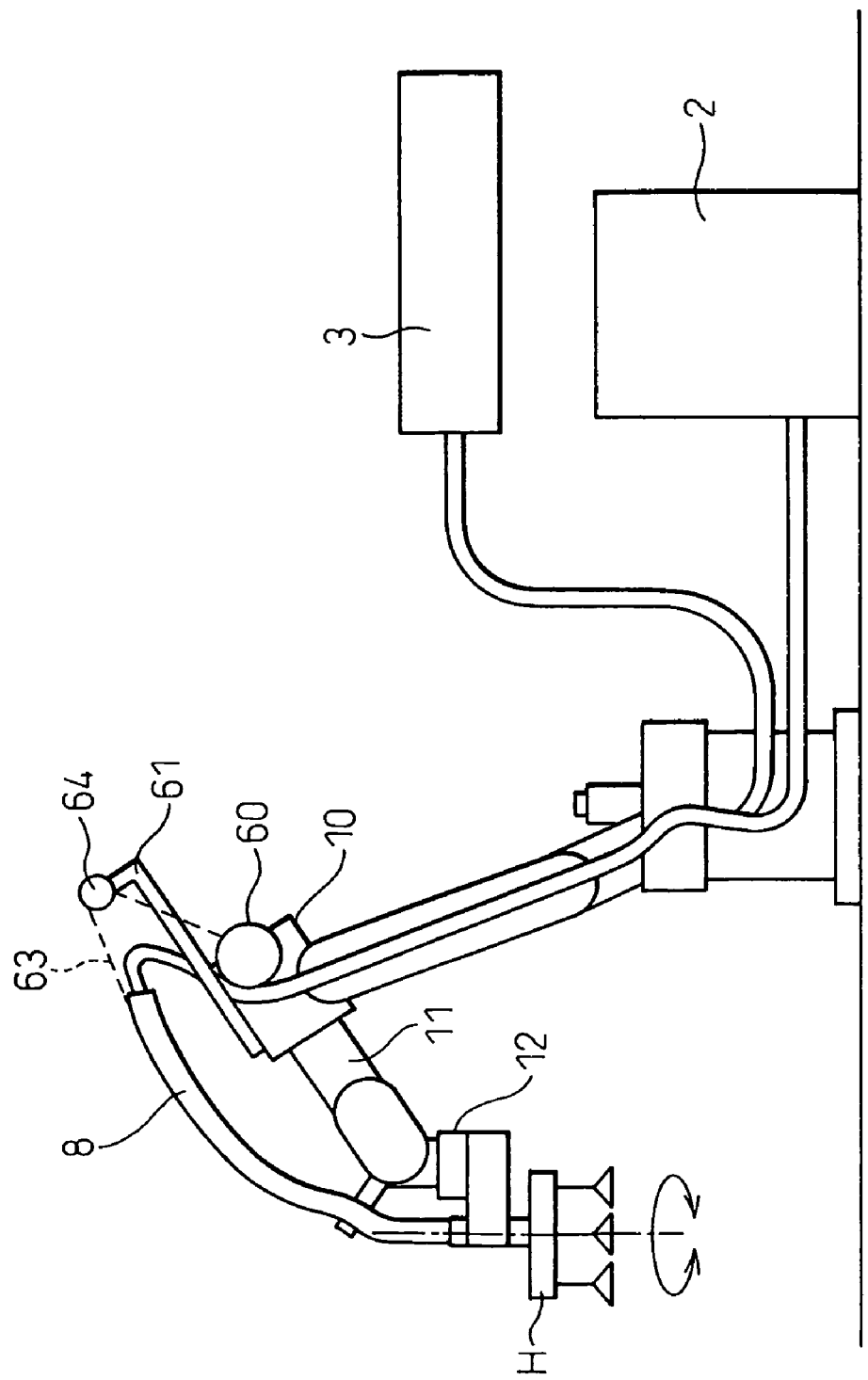

MANAGING STRUCTURE FOR UMBILICAL MEMBER OF INDUSTRIAL ROBOT

This is a Divisional of copending application Ser. No. 11/142,497, filed Jun. 2, 2005, which claims priority to Japanese Patent Application 2004-167411 filed Jun. 4, 2004.

BACKGROUND OF THE INVENTION

1. Field of the Invention

The present invention relates to a managing structure for an umbilical member of an industrial robot used with a working tool mounted thereon.

2. Description of the Related Art

An industrial robot (hereinafter referred to as simply a "robot") has a working tool mounted at the forward end of the front arm thereof, and an umbilical member, containing one or more wires and tubes, is very frequently used to supply, to the working tool, materials including air, energy such as electricity, and signals. In such a case, the umbilical member is generally led to extend above the front arm of the robot to the working tool. FIG. 1 shows an example of such a prior art.

In FIG. 1, reference numeral 1 designates a robot controlled by a robot controller 2. A first wrist element 11 is provided at the forward end of a front arm 10 of the robot 1 so as to be rotatable about a first axis A extending in a longitudinal direction of the first wrist element 11. A second wrist element 12 is mounted on the first wrist element 11 as to be rotatable about a second axis B extending substantially perpendicular to the first axis A. A third wrist element 13 is mounted on the second wrist element 12 so as to be rotatable about a third axis C1 extending substantially perpendicular to the second axis B, and has a working tool H provided at the forward end flange portion thereof. A part (such as a support base) of the working tool H may double as the third wrist element 13.

In this case, the working tool H is a hand having suction pads. Reference numeral 3 designates an air supply/suction unit disposed outside the robot 1. An air tube 31 connected to the air supply/suction unit 3 merges at an appropriate point with a control cable 21 for supplying electric power and electrical signals, etc. and connects to a solenoid valve box 4. The air is supplied or removed through a tube (umbilical member) 7 arranged from the solenoid valve box 4 to the hand H. The robot controller 2 controls the air supply/suction unit 3 and the solenoid valve box 4 in a well-known manner to switch between the air supply to the suction pads of the hand H (i.e. the holding "off" mode) and the air suction (i.e. the holding "on" mode) from the suction pads of the hand H.

The problem posed in this case is that the rotation about the axes A, B, C1 during the operation of the robot 1 may cause the umbilical member 7 to contact with the body (the forward portion beyond the front arm 10) of the robot 1 or to wind around the wrist elements 11, 12 or be pulled strongly by the wrist elements 11, 12. This trend is especially conspicuous in the case where the operation range about the axis C1 is wide (about 360 degrees, for example). For example, in a handling robot system for transferring disordered objects from one pallet to another pallet and arranging them into order, it is generally true that the axes of the wrist elements of the robot maintain a predetermined arrangement and that only the rotation about the last axis (the axis C1) covers a wide range in order to set the objects in phase with each other. Therefore, the above problem is liable to occur in such a handling robot system.

To avoid this problem, in the prior art, a method was employed in which the umbilical member 7 was laid so as to extend away from the robot by a sufficiently large distance body as shown in FIG. 1 and was connected to the hand (working tool) H.

However, such an arrangement of the umbilical member 7 involves a risk that the behavior of the umbilical member 7 is unstable when the robot wrist elements rotates about the axes (especially about the third axis C1), thereby causing the umbilical member 7 to contact (interfere) with a part of the robot body (the forward portion beyond the front arm) or the peripheral devices to damage the umbilical member itself or the peripheral devices. Also, the umbilical member 7 contacting and rubbing other objects generates fine dust and deteriorates the working environment. To overcome this problem, a method is possible in which the motion of the umbilical member 7 is controlled elastically by using an L-shaped member 5 and an elastic member 6 to hang the umbilical member 7 above the front arm 10. However, this method cannot sufficiently prevent the interference. Further, a large burden is imposed on the wires and tubes by the bending or twisting.

SUMMARY OF THE INVENTION

Accordingly, an object of the present invention is to provide a managing structure, for an umbilical member, which allows an umbilical member for supplying air, electricity, etc. to a working tool mounted at a forward end of a wrist of a robot to be laid without being away from the wrist by a large distance while, at the same time, preventing the interference between the robot body (the forward portion beyond the front arm) and the umbilical member.

Another object of the present invention is to provide a managing structure for an umbilical member which can reduce a possibility of deteriorating the environment of the robot operation area.

According to the present invention, there is provided an umbilical member managing structure for laying and managing an umbilical member of an industrial robot, said industrial robot including a first wrist element mounted at a forward end of a front arm thereof so as to be rotatable about a first axis extending in a longitudinal direction thereof, a second wrist element mounted on the first wrist element so as to be rotatable about a second axis extending substantially perpendicular to the first axis, and a working tool mounted on the second wrist element so as to be rotatable about a third axis extending substantially perpendicularly to the second axis, said umbilical member including at least one of a wire and a tube connected to the working tool, wherein the umbilical member managing structure comprises: a flexible conduit for leading the umbilical member inserted therein from the front arm to the working tool; a first conduit mounting portion provided adjacent to the front arm (on the front arm or an object arranged on the front arm); a second conduit mounting portion provided adjacent to a point where the umbilical member is connected to the working tool; one end of the conduit attached to the first conduit mounting portion and the other end of the conduit attached to the second conduit mounting portion; and the conduit laid so that a section thereof between the first conduit mounting portion and the second conduit mounting portion does not contact the body of the robot. The umbilical member managing structure according to the present invention prevents unstable behavior of the umbilical member even if the forward portion of the robot is rotated about a rotational axis thereof, for example, by an angle of nearly 360 degrees.

In the umbilical member managing structure described above, when at least the other end of the conduit is attached to the second conduit mounting portion (the conduction mounting portion of the working tool unit) so as to be rotatable relative to the second conduit mounting portion, a twisting force is prevented from being generated in the conduit even if the forward end of the robot is rotated about the rotational axis thereof by an angle of nearly 360 degrees. This advantageously improves the durability of the conduit.

The umbilical member managing structure may further includes a drawing force generating unit mounted on the front arm, and a wire member connected to the drawing force generating unit, and an intermediate portion of the conduit may be connected to the wire member to draw the conduit rearward of the front arm. In this case, it is preferable that the wire member is preferably turned back, behind the front arm, at an intermediate point of a section thereof leading from the drawing force generating unit to the intermediate portion and is connected to the intermediate portion. This drawing inhibits an undesired surplus or shortage of the conduit length from being caused when the robot wrist rotates about a rotational axis thereof. As a result, the behavior of the umbilical member is stabilized and the motion of the robot wrist axis is easily absorbed in the neighborhood of the front arm.

The drawing force generating unit preferably includes a spring balancer. The use of the spring balancer can generate a constant drawing force while making the drawing force generating unit provided on the front arm of the robot compact.

Also, in order to maintain a clean working environment especially around the working tool, the air in the conduit is preferably sucked. By sucking the air in this manner, dust, if generated by the rubbing of the umbilical member in the conduit, is prevented from flowing to the outside of the conduit especially around the working tool.

Further, the third axis is preferably offset by a predetermined distance from a longitudinal axis extending in a longitudinal direction of the second wrist element to extend parallel to the longitudinal axis.

Preferably, the umbilical member further includes a servo motor for supplying a driving force to rotate the working tool about the third axis, and a transmission mechanism for transmitting the driving force from the servo motor to the working tool so that the transmission mechanism increase or decrease a rotational speed of the servo motor. For example, by transmitting the increased rotational speed of the output shaft of the reduction gear provided at the forward end of the robot to the rotary shaft of the working tool, the maximum rotational speed about the last axis of the robot can be improved with fewer components.

According to the present invention, even if the robot wrist rotates about its rotational axis over a wide range, the umbilical member (cable and/or hose) for the working tool is prevented from exhibiting an unstable behavior in the neighborhood of the front arm of the robot. As a result, the life of the umbilical member can be lengthened while at the same time protecting the umbilical member from being damaged by contacting the surrounding parts. Further, off-line teaching is facilitated as a secondary effect.

BRIEF DESCRIPTION OF THE DRAWINGS

The above and other objects, features and advantages of the present invention will be described in more detail below based on the preferred embodiments of the present invention with reference to the accompanying drawings, wherein:

FIG. 2 is a schematic diagram showing an embodiment of an industrial robot obtained by applying an umbilical member managing structure according to the present invention to a handling robot system having a suction hand as a working tool;

FIGS. 3A and 3B are diagrams for illustrating the states of first and second wrist elements of the robot in the embodiment shown in FIG. 2 when the robot changes a posture thereof, showing first and second postures, respectively;

FIG. 5 is a schematic diagram showing another embodiment of an industrial robot obtained by applying the present invention to a handling robot system having a suction hand as a working tool;

DETAILED DESCRIPTION

Figure 1:
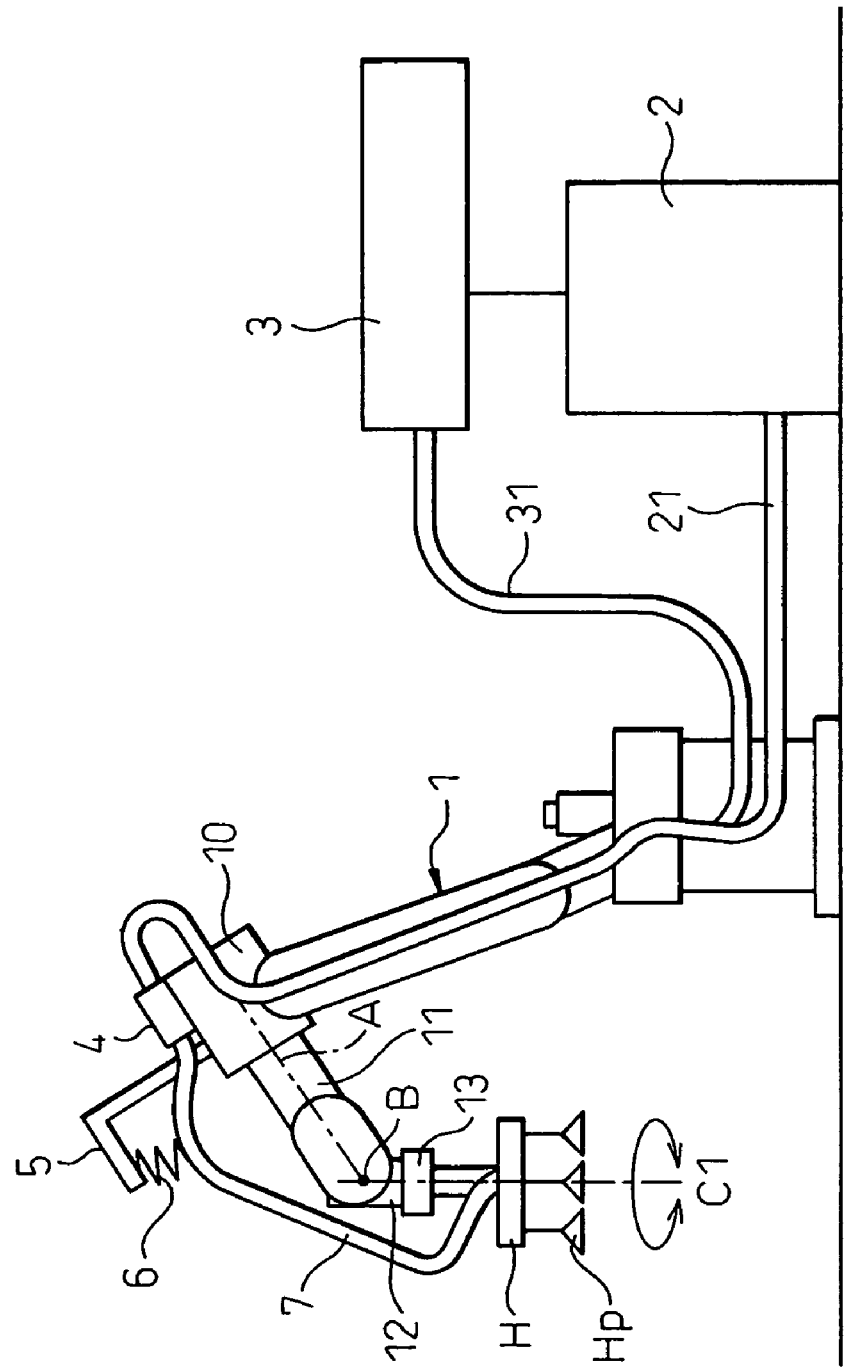
FIG. 1 is a schematic diagram for illustrating the conventional umbilical member managing structure used in a handling robot system having a suction hand as a working tool.

Embodiments of the present invention will be described below with reference to FIGS. 2 to 8B. Although an application using a handling robot system will be described hereinafter, it is only illustrative. FIG. 2 is a schematic diagram showing a general configuration of an industrial robot having an umbilical member managing structure according to an embodiment of the present invention.

In FIG. 2, reference numeral 1 designates a 6-axis handling robot having six degrees of freedom and controlled by a robot controller 2. A first wrist element 11 is mounted at a forward end of a front arm 10 of the robot so as to be rotatable about a first axis A. As shown in FIG. 2, the first axis A extends in a longitudinal direction of the first wrist element 11. A second wrist element 12 is mounted on the first wrist element 11 so as to be rotatable about a second axis B extending substantially perpendicular to the first axis A. A working tool H is mounted on the second wrist element 12 through a transmission mechanism 20 so as to be rotatable about a third axis C2 substantially perpendicular to the second axis B. An example of the transmission mechanism 20 will be described later.

In the shown case, the working tool H is a hand (suction hand) having a plurality of suction pads, and air is supplied to or discharged from the hand H by an air supply/suction unit 3 provided outside of the robot.

The air supply/suction unit 3 is connected with an air tube 31, which is led, together with a control cable 21 for supplying electric power and electric signals, into the robot 1 from a robot base 9, merges with the control cable 21 at an appropriate point and is then connected to a solenoid valve box 4. The air tube 31, instead of being passed through the robot 1, may be laid to extend outside of the robot 1 from the air supply/suction unit 3 to the solenoid valve box 4 (the neighborhood of the front arm 10).

Also, in a section between the solenoid valve box 4 and the hand H, air is supplied and sucked using an air tube (umbilical member). According to the present invention, a flexible conduit (for example, made of a soft resin material) 8 with the air tube (umbilical member) inserted therein is provided in that section. One end (first end, i.e. the end thereof nearer to the front arm) 8a of the conduit 8 is attached to a first conduit mounting portion 4a provided at the front of the solenoid valve box 4, while the other end (second end, i.e. the end thereof nearer to the working tool) 8b is attached to a second conduit mounting portion Hc provided on the base side (the neighborhood of the air tube lead-in, or for example, a part of the transmission mechanism 30) of the working tool H.

The conduit 8 is attached to the second conduit mounting portion Hc so as to be rotatable (about an axis extending in a longitudinal direction thereof). Of course, the conduit 8 may be also attached to the first conduit mounting portion 4a so as to be rotatable. This type of mechanism for attaching the conduit thereto so as to be rotatable is well known and a detailed description is omitted.

The length of the conduit 8 is assumed to be determined such that the body (a forward portion beyond the front arm 10) of the robot 1 is prevented from contacting with the conduit 8 in a section thereof between the neighborhood of the front arm 10 and the working tool. As the working tool (hand) H is rotatably mounted on the forward end of the robot wrist with the center axis (i.e. the third axis C2) thereof offset by a predetermined distance from the center axis (i.e. an axis D1 described later) of the forward end of the robot wrist, the length of the conduit 8 can be easily determined by a simple experiment or the like performed in design stage (in contrast, in the example of FIG. 1, the rotational axis C1 is not offset from the center axis of the forward end of the robot wrist).

In this configuration, the robot controller 2 operates the servo motors for driving the axes of the robot 1 in accordance with commands based on a program or the like in a well-known manner, so that the hand H assumes a position and orientation suitable for sucking an object to be handled (see FIG. 3) and the hand H is moved to a target point. Further, in addition to the operation commands, the robot controller 2 outputs a suction-on command, a suction-off command and a control command for controlling the air supply/suction unit 3 and the solenoid valve in the solenoid valve box 4 at appropriate times. As a result, the air supply (i.e. the hold-off mode) to the suction pads Hp of the hand H and the air suction (i.e. the hold-on mode) from the suction pads Hp of the hand H are switched to each other.

As the handling operation of this type is well known, the detailed description thereof is omitted. The robot 1 appropriately changes the arm orientation in accordance with the handling position and performs the handling operation while controlling the position and orientation of the hand H. Also, a signal line may of course be connected to the hand H to check the presence of the object to be handled or other things. In such a case, the signal line is also contained in the umbilical member (i.e. the umbilical member inserted in the conduit 8) connected to the working tool H. In the case where more than two or more of material, energy or signal, etc., are supplied to the working tool as described above, the umbilical member may assume a form of a bundle including a plurality of cables and/or hoses or a form of a single composite cable and/or hose. Also in such a case, all the cables and/or hoses are preferably inserted in the conduit 8. A term "air tube" used in the following description includes all of various types of umbilical member described above.

Generally, when the posture of the robot arm is changed, a great variety of motions constituted by a combination of a part or all of the rotation of the first wrist element 11 about the first axis A, the rotation of the second wrist element 12 about the second axis B and the rotation of the third wrist element 13 about the third axis C2, can be performed. The handling robot shown in this example normally picks up an object to be handled from above, and therefore the posture for sucking the object and the posture for releasing the object are determined automatically.

Specifically, in a series of operations from suction to release of the object, the posture of the first wrist element 11 substantially coincides with the wrist posture in the standard robot posture, and the second wrist element 12 assumes a posture in which the second wrist element 12 is rotated by about 90 degrees from the standard robot wrist posture in such a direction that the forward end of the working tool (hand) H is directed downward. A similar wrist posture is generally found in the handling application as well as other applications including arc welding and sealing.

In such a wrist posture, the fact that "the working tool (hand) H is mounted at a position offset by a predetermined distance from the center axis thereof on the forward end of the robot wrist so as to be rotatable" and "the umbilical member (cable/hose) for supplying air (generally, material, energy, signal, etc.) to the working tool is passed through the flexible conduit 8" has a very important meaning. This flexible conduit 8 is extended without contacting with the body of the robot 1 between the front arm and the working tool, and kept so also during the robot operation.

FIGS. 3A and 3B are diagrams for illustrating states of the first wrist element 11 and the second wrist element 12 of the robot when the posture of the robot is changed, showing a first posture and a second posture, respectively. For example, in a case where a handling operation is performed to transfer workpieces W1, W2 placed at random on a table TB to another table TB and arranging them into order as shown in FIGS. 3A and 3B, the robot wrist can be maintained in substantially the same posture throughout the two illustrated robot postures (i.e. the first and second postures). In other words, as shown in FIGS. 3A and 3B, the first wrist element 11 can be limited to a standard posture and the second wrist element 12 to a posture in which the second wrist element 12 is directed in a direction substantially perpendicular to the ground surface.

The last axis of the robot 1 requires an operation range of about 360 degrees for bringing the objects into the same phase. Even after considering this requirement, the first wrist element 11 and the second wrist element 12 can assume substantially a constant posture. Also, in the case where the conduit 8 is supported rotatably on the rear side of the working tool H (conduit mounting portion Hc, as shown in FIG. 2) as in this embodiment, even when the robot is rotated about the last axis thereof by a large angle, the conduit 8 itself can be kept substantially immovable while the umbilical member (air hose, cable, etc.) in the conduit 8 is twisted. As a result, the behavior of the umbilical member accommodated in the conduit 8 can be stabilized.

With a system in which the operation range of the first wrist element 11 about the first axis A is small, the conduit 8 may be fixedly connected to the solenoid valve box 4 (the conduit mounting portion 4a).

In contrast, with a system in which the operation range of the first wrist element 11 about the first axis A is large, the conduit 8 is preferably attached to the solenoid valve box 4 so as to be rotatable, as in the conduit mounting portion Hc. By doing so, the conduit 8 is advantageously subjected to a lesser twisting force during the rotation of the first wrist element 11 about the first axis A.

The umbilical member (cables/hoses) in the conduit 8, which is not shown, is partly connected to the solenoid valve in the solenoid valve box 4 and finally connected through the robot arm to the robot controller 2 and the air supply/suction unit 3, etc. Also, as described above, as an alternative, the cables and/or hoses from the solenoid valve box 4 may extend in the air on the back side of the robot and be connected directly to the controller 2 and the air supply/suction unit 3, etc.

In order to reduce the load on the robot arm, the solenoid valve box 4 may be provided in the neighborhood of the robot base 9. In such a case, the conduit 8 is fixed directly on the rear upper surface of the front arm 10 to assure stability on the front arm 10. After being fixed so, the conduit 8 is removed so that only the cables/hoses which have accommodated in the conduit 8 are left in the air on the back side of the robot arm or the robot, and the cables/hoses are connected to the robot controller 2 and the air supply/suction unit 3, etc.

Figure 4:
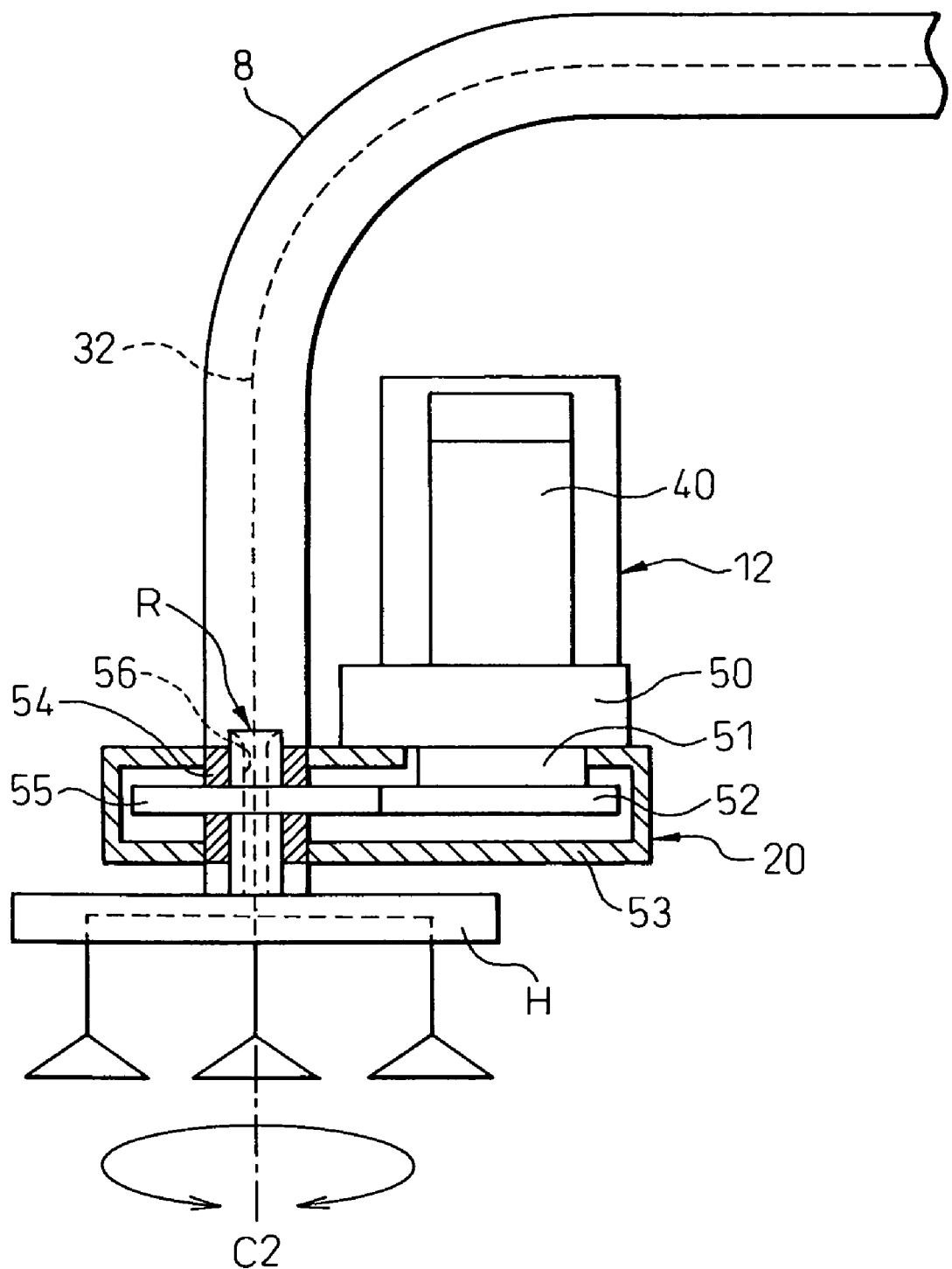
FIG. 4 is an enlarged sectional view showing the working tool and the surrounding parts of the embodiment shown in FIG. 2.

Next, an example of a support structure for the working tool H will be described with reference to FIG. 4 and shows an enlarged cross section of the area near the working tool H. In FIG. 4, reference numeral 40 designates a servo motor, and reference numeral 50 designates a reduction gear having the input side thereof coupled to an output shaft (not shown) of the servo motor 40. The output side of the reduction gear 50 is coupled to an input gear 52 of the transmission mechanism (designated by reference numeral 20 in FIG. 2) through an output flange 51 of the reduction gear 50. The servo motor 40 is mounted on the second wrist element 12 together with the reduction gear 50 to drive the last axis of the robot.

The transmission mechanism 20 has the input gear 52 described above and an output gear 55 in mesh with the input gear 52. Reference numeral 53 designates a gear box accommodating the input gear 52 and the output gear 55. The gear box 53 is fixed on the second wrist element 12 in the shown embodiment. Alternatively, the gear box 53 may be fixed on a component fixed on the second wrist element 12 such as the housing of the servo motor 40 or the reduction gear 50. When the servo motor 40 is driven, the input gear 52 is also driven through the reduction gear 50 and the output flange 51.

The working tool H has a cylindrical extension formed with a hole 56. This extension is supported by the gear box 53 through a bearing 54 so as to be rotatable about the third axis C2 and is coupled (integrated) with the output gear 55. Therefore, when the input gear 52 driven by the servo motor 40 to rotate, the output gear 55 is rotated accordingly and the working tool H is rotationally driven about the third axis C2 passing through the hole 56. Although the bearing 54 is fixed on the second wrist element 12 through the gear box 53, it may alternatively be designed to be fixed on another component fixed on the second wrist element 12 such as the housing of the servo motor 40 or the reduction gear 50 or to be fixed directly on the second wrist element 12.

As described above, the input gear 52 and the output gear 55 are arranged in the gear box 53. The input gear 52 is supported on the output flange 51, while the output gear 55 is supported on the gear box 53 through the bearing 54 so as to be rotatable. The hand H is fixed on the forward end of the extension extending from the output gear 55, and the conduit 8 is rotatably connected to the other end of the extension. In this embodiment, the conduit 8 is connected to the gear box 53, and the internal umbilical member (cable/hose such as an air hose) 32 is connected to the suction pads or the like in the hand H through the hole 56 of the output gear 55. The umbilical member lead-in portion in the hole 56 of the extension extending from the output gear 55 is preferably rounded with a curve R or otherwise designed not to damage the cable/hose.

When the servo motor (the sixth axis drive motor of the robot in this case) 40 provided at the forward end of the second wrist element 12 is actuated, the input gear 52 is rotationally driven through the reduction gear 50 and the rotation of the input gear 52 is transmitted to the working tool H through the output gear 55. Thus, in accordance with the command from the robot controller 2, the posture of the working tool H about the third axis C2 can be freely changed. In changing the posture, the direction of rotation (clockwise or counterclockwise direction) can be freely changed by selecting the rotational direction of the servo motor 40.

Figure 8A:
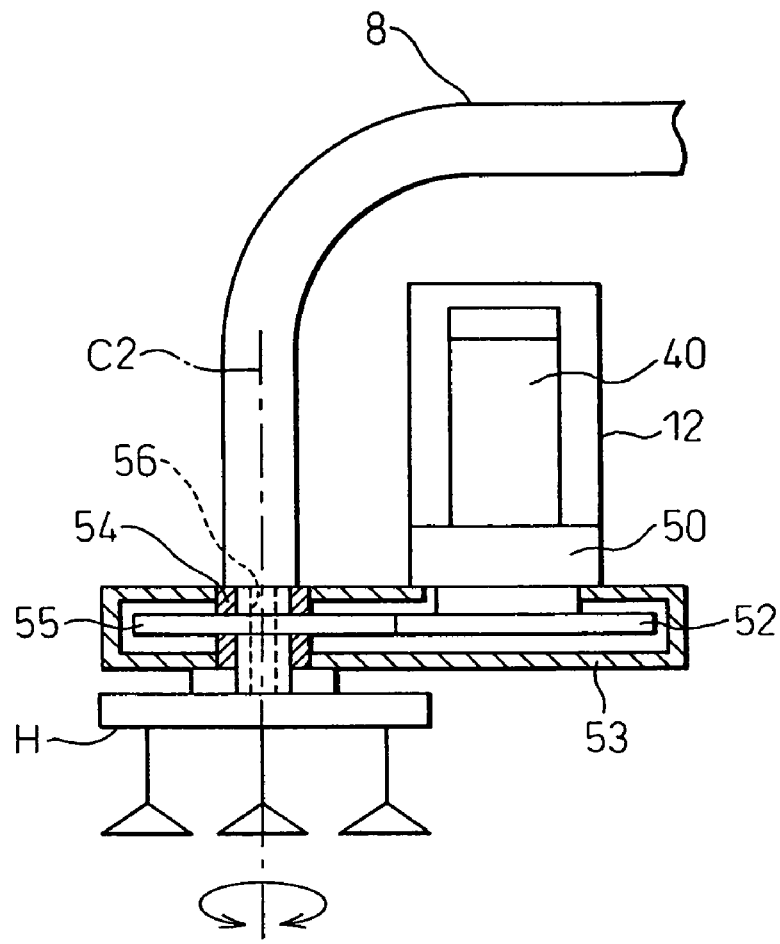
FIGS. 8A and 8B are a sectional view and a schematic diagram, respectively, showing an example of a configuration in which the speed of rotation of the working tool about its rotational axis is increased using a transmission mechanism.
Figure 8B:
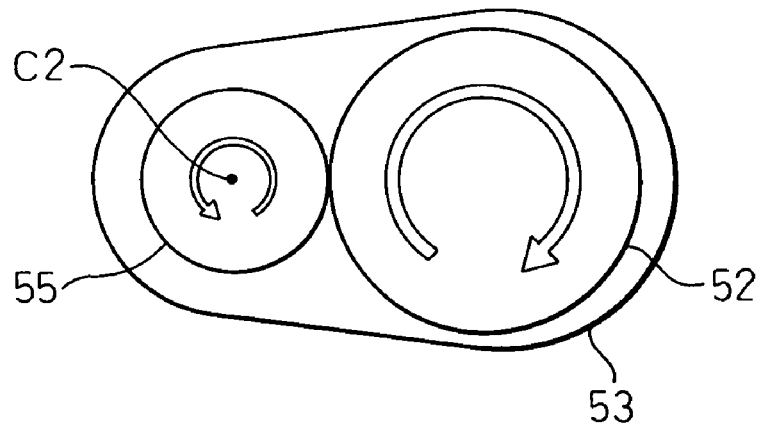

Also, the speed change ratio between the input gear 52 and the output gear 55 can be determined taking the rotational speed, the torque and the reduction ratio of the reduction gear 50 required for the working tool H into consideration. For example, in the case where a high rotational speed is required for the working tool H, a speed-increasing gear as shown in FIGS. 8A, 8B can be employed. Specifically, in a system where the forward end axis of the robot is rotated by about 360 degrees, the maximum speed required of the last axis of the robot is naturally increased. However, as the drive system for driving the last axis of the robot is arranged at the forward end of the robot, the weight is required to be decreased at the same time. The robot is required to be designed by considering a tradeoff between these conditions, which naturally limits the maximum rotational speed of the last axis. On the other hand, the employment of a system in which the rotation of the last axis of the robot is converted by the gear mechanism as in this embodiment, makes it possible to transmit the low rotational speed output to the output shaft of the reduction gear 50 to the output gear 55 having a relatively small diameter from the input gear 52 having a relatively large diameter as shown in FIG. 8B, so that a high maximum rotational speed can be supplied to the working tool H.

FIG. 5 shows an embodiment in which the behavior of the conduit 8 is restricted by a drawing force generating unit. In FIG. 5, reference numeral 60 designates a drawing force generating unit mounted on the front arm 10. For example, a spring balancer is used as the drawing force generating unit 60. The drawing force generating unit 60 is connected with a wire member 63. The wire member 63 extends toward a pulley 64 provided rearward of the front arm 10, turns back around the pulley 64 and is connected to the conduit 8 at the point thereof near the end nearer to the front arm. Reference numeral 61 designates a support base fixed on the front arm 10, and the pulley 64 is arranged on the support base 61.

This structure makes it possible to keep the conduit 8 drawn toward the rear side of the front arm 10 under an appropriate drawing force. The amount of the drawing is determined by the balance between the drawing force from the wrist forward end and the drawing force from the drawing force generating unit 60. Therefore, even in the case where the second wrist element 12 is rotated about the second axis B, both an undesired surplus or a shortage of the length of the conduit 8 can be prevented from occurring.

Figure 6A:
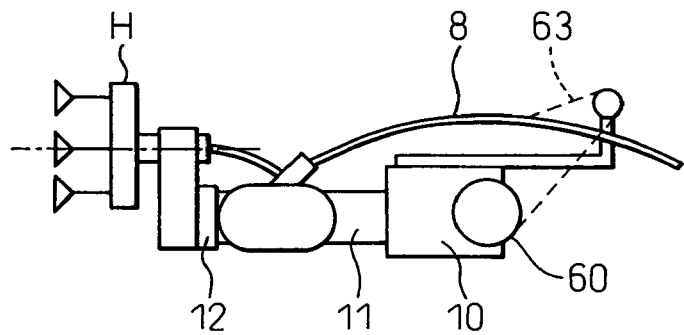
FIGS. 6A to 6C are diagrams for illustrating the behavior of the conduit in the embodiment shown in FIG. 5 when the second wrist element is rotated about a second axis, showing the first, second and third postures, respectively.
Figure 6B:
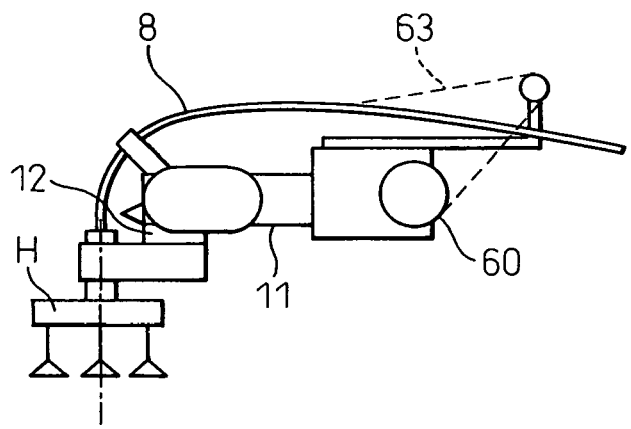
Figure 6C:
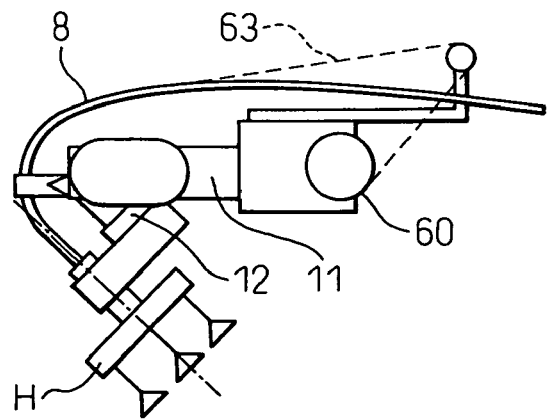

Further, as the conduit 8 is always kept drawn rearward, the conduit 8 continues to assume a posture in which the conduit 8 extends along the front arm 10 even when the second wrist element 12 is rotated about the second axis B. FIGS. 6A to 6C show the change in posture of the conduit 8 with the change of the robot posture. Specifically, FIG. 6A shows a first posture in which the second wrist element 12 is rotated about the second axis B to direct the forward end of the hand H horizontally leftward in the drawing, FIG. 6B shows a second posture in which the forward end of the hand H is directed justly downward in the drawing, and FIG. 6C a third posture in which the forward end of the hand H is directed diagonally rearward right. As seen from FIGS. 6A to 6C, the conduit 8 remains stable throughout the first to third postures and the posture thereof is substantially unchanged. Also, the conduit 8 cannot approach the body of the robot to the extent of contacting the forward potion of the body beyond the front arm 10. In this embodiment, a spring balancer is used as the drawing force generating unit 60 and, therefore, the device for generating a constant drawing force can be advantageously arranged in compact fashion on the front arm of the robot.

Figure 7:
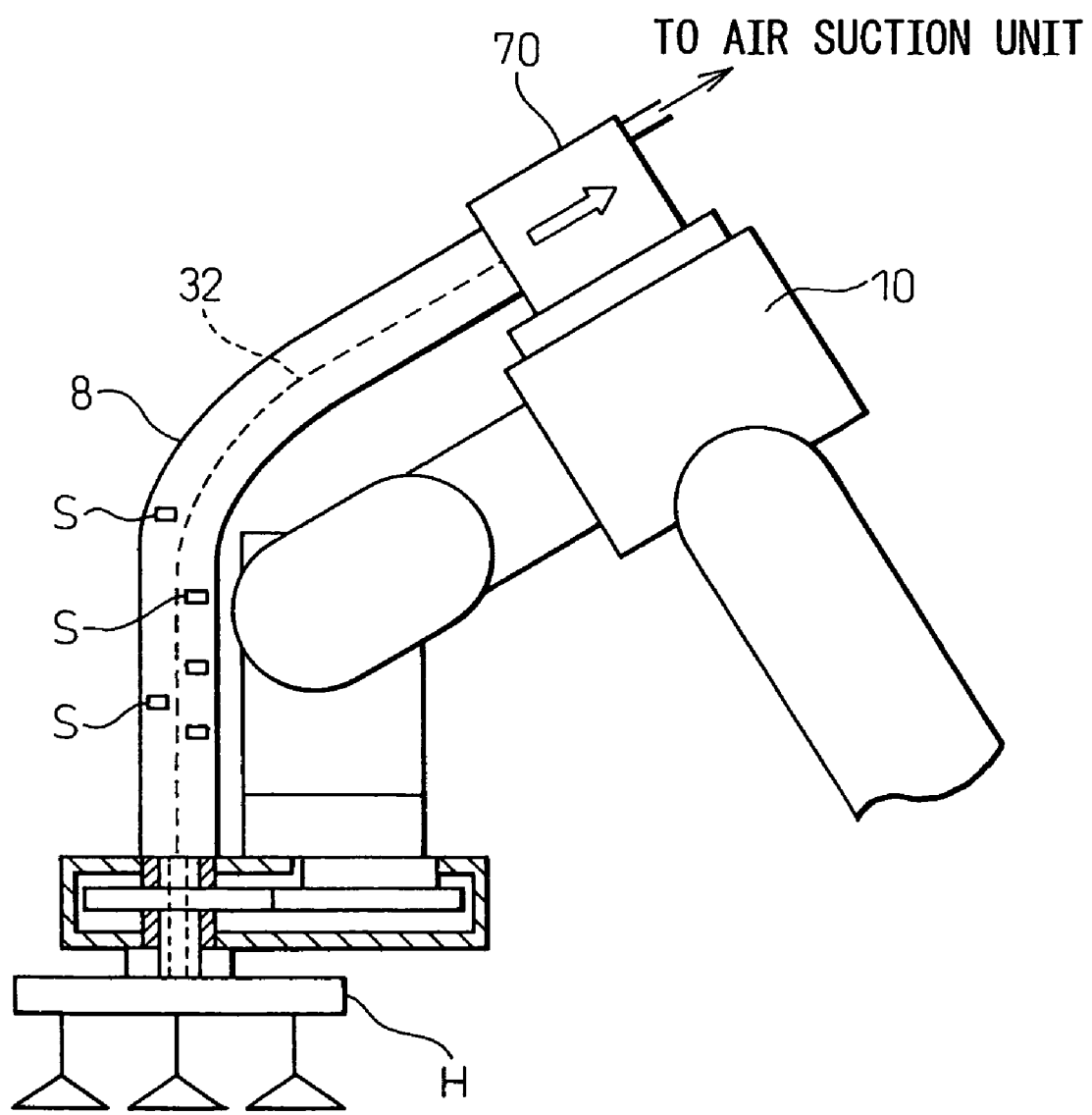
FIG. 7 is a schematic diagram showing a modified embodiment in which air in the conduit is sucked.

Finally, an embodiment in which air is sucked from the conduit 8 will be described briefly with reference to FIG. 7. In an example shown in FIG. 7, the air in the conduit 8 is sucked to rearward of the front arm 10 by the air suction unit 70 provided on the front arm 10. As a result, dust S generated by the rubbing of the umbilical member (cable/hose) 32 in the conduit 8 is prevented from flowing out of the conduit 8.

The rubbing between a plurality of umbilical members (cables/hoses) 32 and between one or a plurality of the umbilical member 32 and the inner wall surface of the conduit 8 during the operation of the robot wrist axis may generate dust S in the conduit 8. If the dust S leaks out, it deteriorates the working environment. Especially, if the dust S falls on the side of the working tool H and leaks out, the object to be handled (such as a workpiece including a semiconductor device chip) would be polluted.

The problem of deteriorating the working environment and polluting the object to be handled can be avoided by sucking the internal air of the conduit 8 from the rear end of the conduit 8. Regardless of whether or not air is sucked in this way, the interior of the conduit 8 is of course preferably hermetically sealed from the external environment as far as possible in order to prevent dust leakage.

While the present invention has been described above with reference to the specific embodiments shown in the accompanying drawings, these embodiments are only for illustrative and are not limitative. Therefore, the scope of the present invention is only limited by the appended claims and the preferred embodiments of the present invention may be modified or changed in any way without departing from the scope of the claims.

What is claimed is:

1. An umbilical member managing structure for laying and managing an umbilical member of an industrial robot, said industrial robot comprising a first wrist element mounted at a forward end of a front arm thereof so as to be rotatable about a first axis extending in a longitudinal direction thereof, a second wrist element mounted on said first wrist element so as to be rotatable about a second axis extending substantially perpendicular to the first axis, said second wrist element extending along a longitudinal axis thereof substantially perpendicular to the second axis, and a working tool mounted on the second wrist element so as to be rotatable about a third axis extending substantially perpendicular to the second axis, said umbilical member including a tube connected to said working tool, wherein said third axis is offset by a predetermined distance from said longitudinal axis of said second wrist element so as to extend parallel to said longitudinal axis, wherein said managing structure comprises:

a flexible conduit for leading said umbilical member inserted therein from said front arm to said working tool;

a first conduit mounting portion provided adjacent to said front arm;

a second conduit mounting portion provided on a side of said working tool opposite to a forward end of said working tool and adjacent to a point where said umbilical member is connected to said working tool;

one end of said conduit being attached to said first conduit mounting portion and the other end of said conduit being attached to said second conduit mounting portion so that said umbilical member extends lateral to said second wrist element on the side of said axis substantially in a direction of said third axis through said second conduit mounting portion from said working tool into said conduit and extends above an air section unit provided on said front arm; and said conduit is laid so that a section thereof between said first conduit mounting portion and said second conduit mounting portion does not contact a body of said robot, and wherein at least said other end of said conduit is attached to said second conduit mounting portion so as to be rotatable relative to said second conduit mounting portion and wherein air in said conduit is sucked by the air suction unit.

2. The umbilical member managing structure according to claim 1, wherein said umbilical member managing structure further comprising:

a drawing force generating unit mounted on said front arm; and a wire member connected to said drawing force generating unit, and wherein an intermediate portion of said conduit is connected to said wire member to draw said conduit rearward of said front arm.

3. The umbilical member managing structure according to claim 2, wherein said wire member is turned back, behind said front arm, at an intermediate point of a section thereof leading from said drawing force generating unit to said intermediate portion and is connected to said intermediate portion.

4. The umbilical member managing structure according to claim 2, wherein said drawing force generating unit comprises a spring balancer.

5. The umbilical member managing structure according to claim 1, further comprising a servo motor for supplying a driving force to rotate said working tool about the third axis, and a transmission mechanism for transmitting the driving force from said servo motor to said working tool so that said transmission mechanism increases or decreases a rotational speed of said servo motor.

* * * * *